Oct. 14, 1947.     A. L. FORBES, JR     2,429,052
PIPE END SHAPER
Filed Sept. 29, 1944     3 Sheets-Sheet 3

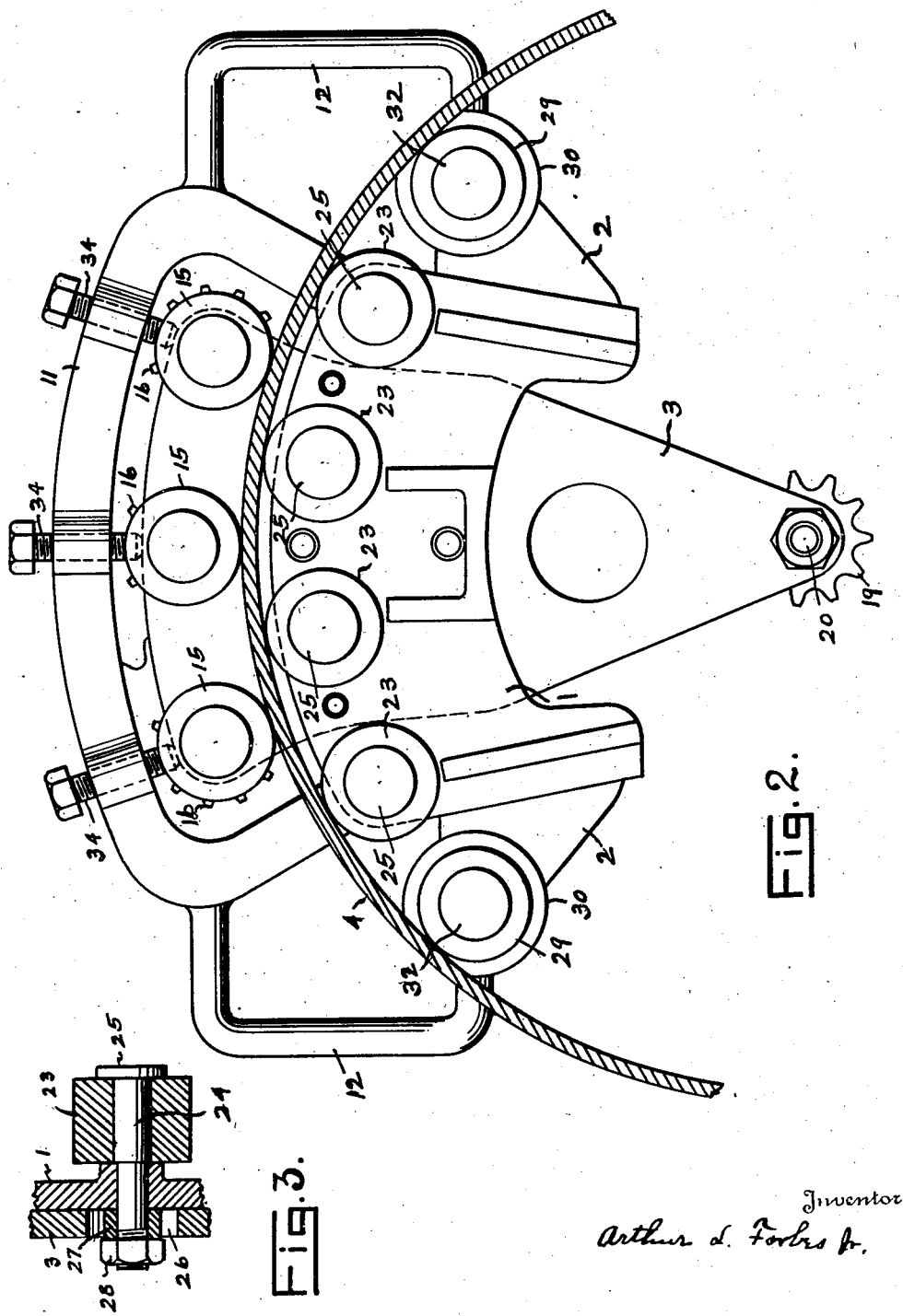

Inventor
Arthur L. Forbes Jr.
By
E. J. Hardway,
Attorney

Patented Oct. 14, 1947

2,429,052

UNITED STATES PATENT OFFICE 2,429,052

PIPE END SHAPER

Arthur L. Forbes, Jr., Houston, Tex.

Application September 29, 1944, Serial No. 556,467

2 Claims. (Cl. 153—54)

This invention relates to a pipe end shaper.

An object of the invention is to provide a shaper of the character described which has been particularly designed for the purpose of reshaping pipe ends that have become misshapen and are out of round.

In welding together pipe sections in the construction of pipe lines and similar work it becomes necessary, at times, to reshape the ends of the pipe to be welded together so that they will perfectly align. The machine herein described has been designed for that, and similar, purposes.

Another object of the invention is to provide a machine of the character described embodying a frame with shaping rollers arranged to move about the pipe and on the inside and outside thereof and which may be adjusted into position to receive the pipe between them and then adjusted into close contact with the inside and outside of the pipe so that as they are moved around the pipe end they will bring said end to a circular shape and smooth out any irregularities in the end of the pipe.

It is a further object of the invention to provide a machine of the character described that is comparatively light and is portable so that it can be readily applied to and removed from the pipe.

With the above and other objects in view the invention has particular relation to certain novel features of construction, operation and arrangement of parts, an example of which is given in this specification and illustrated in the accompanying drawings, wherein—

Figure 2 shows an elevational view as seen from the side opposite that shown in Figure 1.

Figure 3 shows a fragmentary, sectional view taken on the line 3—3 of Figure 1.

Figure 1:
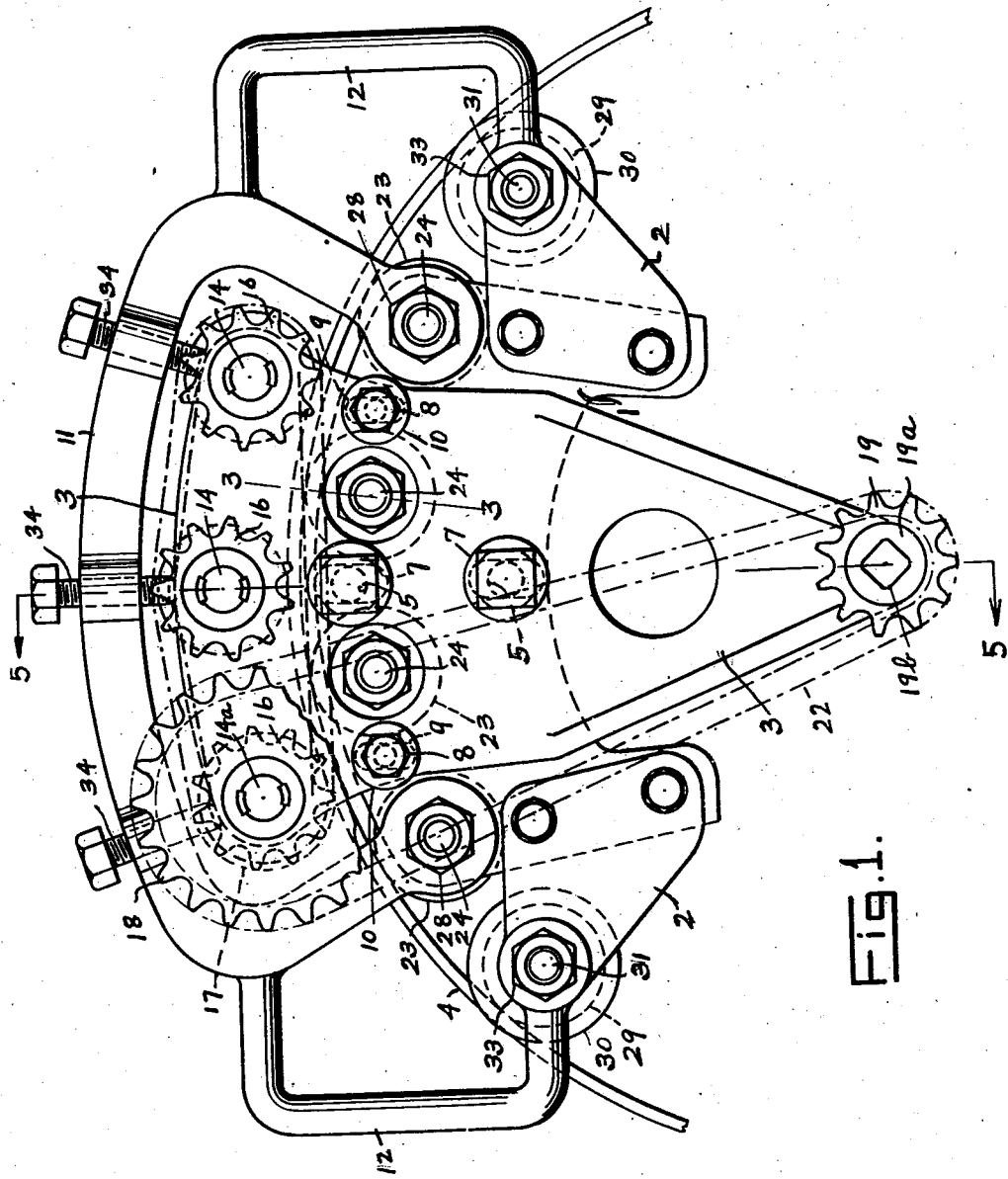
Figure 1 shows an elevational view of the machine as applied to the pipe end.

Referring now more particularly to the drawings wherein like numerals of reference designate the same parts in each of the figures, the numeral 1 designates the inner plate of the framework which is of a general arcuate shape as shown in Figures 1 and 2. The ends of this plate are widened radially inwardly with respect to the pipe to which the machine is applied and bolted or otherwise secured to these widened ends are the brackets 2, 2.

Fitted against this inner plate 1 there is an outer plate 3 of a general triangular shape as shown in Figures 1 and 2. The outer margin of the plate 3 is of an arcuate shape as more clearly shown in Figure 2 and it extends radially inwardly with respect to the pipe, with its apex located at the center of the pipe. The pipe referred to is designated by the numeral 4.

The plates 1 and 3 may be clamped together by the clamp bolts 5, 5. These clamp bolts pass through the radial slots 6, 6 of the plate 3 and their inner ends are screwed into the plate 1. They have enlarged heads with the washers 7, 7 between the heads and the plate 3, said bolts passing through said washers as shown clearly in Figure 5. Accordingly the bolts 5 when screwed home will clamp the washers against the plate 3 and thus clamp said plates against relative movement. Upon release of the bolts 5 said plates 1 and 3 may be adjusted relative to each other. Said plates are also secured together by the bolts 8, 8 similar to the bolts 5 which pass through radial slots 9, 9 in the plate 3 and are screwed into the plate 1. These bolts 8 pass through the washers 10, 10 which are arranged to clamp against the plate 3 in the same manner as the washers 7 and the bolts 8 should also be loosened to permit relative adjustment of said plates and then tightened to clamping position to maintain the plates against relative movement.

There is an arcuate yoke 11 whose ends are fastened to the inner plate 1, in the manner hereinafter explained, and formed integrally with this yoke, at its ends, are the grip members 12, 12 which are also connected to the brackets 2, 2 as shown in Figure 1.

Figures 4, 5:
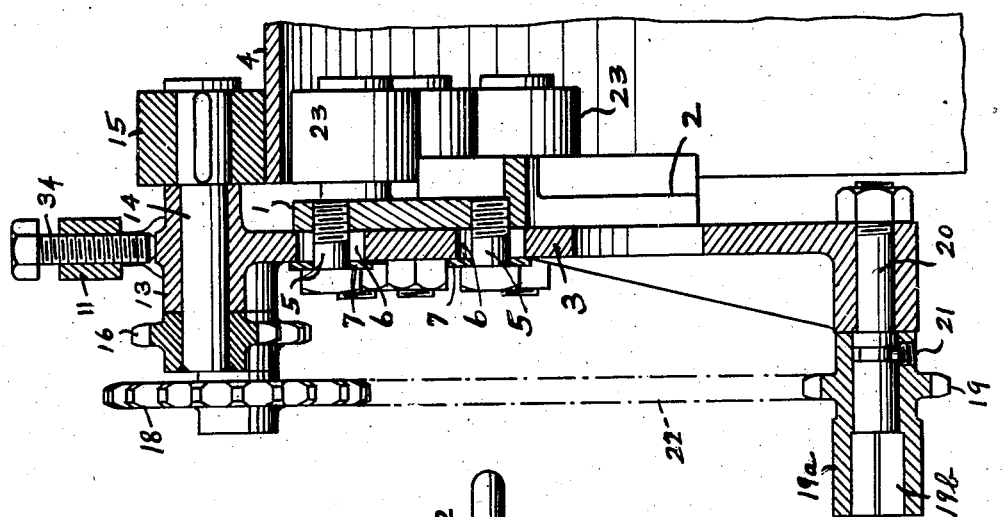
Figure 4 shows a top plan view.
Figure 5 shows a sectional view taken on the line 5—5 of Figure 1.

The outer margin of the plate 3 is formed with elongated bearings 13, 13, 13 which have parallel axes, said axes being also parallel to the axis of the pipe and mounted to rotate in these bearings 13 are the spindles 14, 14 and 14a. Keyed on the rear ends of these spindles are the pipe shaping rollers 15, 15, 15 whose outer surfaces are preferably knurled or roughened as shown in Figure 4. Fixed on the opposite ends of the spindles are the sprocket wheels 16, 16, 16 over which the sprocket chain 17 operates so that said sprocket wheels and the spindles 14, 14a and the pipe shaping rollers 15 will be simultaneously driven.

The spindle 14a extends forwardly beyond the corresponding sprocket wheel 16 and fixed on said extended end there is a large sprocket wheel 18 which is aligned with a smaller sprocket wheel 19 which is mounted to rotate on the spindle 20 and is keyed thereon by the key 21. This spindle is fixed on the plate 3, at the apex thereof, as shown in Figure 1 and is in parallel relation with the spindles 14, 14a. A sprocket chain 22 operates over the sprocket wheels 18, 19 as indicated in Figures 1 and 5. The sprocket wheel 19 may be turned in any preferred manner. As shown it has an extended hub 19a provided with a polygonal socket 19b to receive the correspondingly shaped end of a crank or shaft through which rotation may be imparted to the sprocket wheel 19. It may be either manually or power driven. Upon rotation of the sprocket wheel 19 the sprocket wheel 18 will be correspondingly rotated as well as the sprocket wheels 16 and the pipe shaping rollers 15.

As hereinbefore stated the rollers 15 travel around the outside of the pipe.

Mounted on the plate 1 are the inside rollers 23, four of these being shown, although a greater or less number may be employed. They are mounted to rotate on spindles 24. These spindles have the retaining heads 25, at one end, and their other ends are reduced and fitted through bearings in the plate 1 and on through enlarged openings 26 in the plate 3. Within the openings 26 are the spacers 27 and clamp nuts 28 are screwed onto the forward ends of the spindles 24 and against the spacers 27, as shown in Figure 3, to clamp said spindles securely in place. The ends of the yoke 11 are fitted over the end spindles 24 and clamped against the plate 1 by the corresponding clamp nuts 28 as is shown more clearly in Figure 1.

As clearly shown in Figure 2 the outside rollers 15 are arranged in arcuate relation to each other so as to roll against the outside of the pipe and the inside rollers 23 are also in arcuate relation and are arranged to roll against the inside of the pipe.

The numerals 29, 29 designate guide rollers, arranged on each side of the inside pressure rollers 23 and in arcuate relationship therewith so as to ride against the inside of the pipe. These rollers have the flanges 30 which are provided to engage the end of the pipe, as shown in Figure 1 and to guide the machine around the pipe in a uniform course. They are mounted to rotate on the spindles 31, 31 having heads 32, 32 on their inner ends, to retain the rollers thereon and whose other ends extend through the brackets 2 as well as through eyes in the ends of the grip members 12 said last mentioned ends being threaded to receive the clamp nuts 33, 33.

Threaded through the yoke 11 are the jack screws 34, 34, 34 whose inner ends bear against the corresponding bearings 13. They are provided for relatively adjusting the plates 1 and 3 and the outer and inner series of rollers carried thereby.

In applying the machine to the work the bolts 5 and 8 may be released and the jack screws 34 may be partially unscrewed and the frame plate 3 moved radially outwardly relative to the frame plate 1 so as to space the outer rollers 15 outwardly a sufficient distance from the inner rollers 23 to allow the machine to be readily applied to the end of the pipe 4 into the position shown in Figure 5. The plate 3 may then be forced radially inwardly by tightening up on the jack screws 34 so as to force the rollers 15, 23 and 29 firmly against the outer and inner sides of the pipe and the clamp bolts 5 and 8 may then be again tightened up to secure the frame plates 1 and 3 securely in position against movement relative to each other. The sprocket wheel 19 may then be rotated transmitting a positive rotation to the outer, or traction, rollers 15 and causing the machine to move around the pipe end and any irregularities in said pipe end will thus be smoothed out and the end will be brought to a perfectly circular shape. The operation may be continued until the desired result is obtained and, if necessary, the plates 1 and 3 may be adjusted as before in order to apply the desired pressure to the pipe to accomplish the intended purpose.

It is, of course, obvious that changes in the mechanical construction may be made, if found desirable, within the scope of the appended claims.

What I claim is:

1. A pipe end shaper comprising, a framework composed of an inner plate of a general arcuate shape, an outer plate of a general triangular shape fitted against the inner plate, said outer plate being extended radially inwardly with respect to the pipe so that its apex will be located at the center of the pipe to be shaped, means for clamping the plates together, said clamping means being formed to allow the radial adjustment of the plates relative to each other, a series of arcuately arranged rollers on the inner plate arranged to bear against the inner side of the pipe end, a series of arcuately arranged rollers on the outer plate arranged to bear against the outer side of the pipe end, means carried by the inner plate for adjusting said plates radially relative to each other and rotatable means mounted at the apex of the outer plate and operatively connected with at least one of the rollers of the outer series whereby said roller may be rotated to cause the rotation of the framework and rollers about the pipe end.

2. A pipe end shaper comprising, a framework composed of an inner member whose outer margin is of a substantially arcuate shape, an outer member associated with the inner member and being extended radially inwardly with respect to the pipe to the center of the pipe to be shaped, means for clamping said members together, said clamp means being formed to allow the radial adjustment of the members relative to each other, a series of arcuately arranged rollers on the inner member arranged to bear against the inner side of the pipe and, a series of arcuately arranged rollers on the outer member arranged to bear against the outer side of the pipe end, means carried by the inner member for adjusting said members radially relative to each other and rotatable means mounted on the inward extension of the outer member and operatively connected with at least one of the rollers of the outer series whereby said roller may be rotated to cause the rotation of the framework and rollers about the pipe end.

ARTHUR L. FORBES, Jr.

REFERENCES CITED

The following references are of record in the file of this patent:

UNITED STATES PATENTS

| Number | Name | Date |
|---|---|---|
| 893,434 | Brinkman | July 14, 1908 |
| 909,182 | Hart | Jan. 12, 1909 |
| 1,113,196 | Conover | Oct. 13, 1914 |
| 1,782,483 | Snyder | Nov. 25, 1930 |
| 2,016,735 | Abramson et al. | Oct. 8, 1935 |
| 2,164,724 | Severin | July 4, 1939 |
| 2,309,344 | Harrington | Jan. 26, 1943 |
| 2,357,793 | Clark | Sept. 12, 1944 |

FOREIGN PATENTS

| Number | Country | Date |
|---|---|---|
| 276,509 | Germany | July 13, 1914 |